(12) United States Patent
Hencken et al.

(10) Patent No.: US 7,971,493 B2
(45) Date of Patent: Jul. 5, 2011

(54) METHOD FOR OPERATION OF A FLOW MEASUREMENT DEVICE, AND A FLOW MEASUREMENT DEVICE ITSELF

(75) Inventors: Kai Hencken, Lörrach (DE); Daniel Schrag, Lufingen (CH); Troy Wray, Quedgeley (GB)

(73) Assignee: ABB AG, Mannheim (DE)

( * ) Notice: Subject to any disclaimer, the term of this patent is extended or adjusted under 35 U.S.C. 154(b) by 137 days.

(21) Appl. No.: 12/355,551

(22) Filed: Jan. 16, 2009

(65) Prior Publication Data

US 2009/0205439 A1 Aug. 20, 2009

(30) Foreign Application Priority Data

Jan. 18, 2008 (DE) .......................... 10 2008 005 258

(51) Int. Cl.
*G01F 1/64* (2006.01)
(52) U.S. Cl. ........................................... 73/861.12
(58) Field of Classification Search ................. 73/861.12
See application file for complete search history.

(56) References Cited

U.S. PATENT DOCUMENTS

| | | | |
|---|---|---|---|
| 6,431,011 B1 * | 8/2002 | Feller ....................... | 73/861.12 |
| 6,697,742 B1 | 2/2004 | Franklin et al. | |
| 6,722,207 B1 * | 4/2004 | Feller ....................... | 73/861.12 |
| 2003/0051557 A1 | 3/2003 | Ishikawa et al. | |
| 2005/0115334 A1 | 6/2005 | Brockhaus et al. | |

FOREIGN PATENT DOCUMENTS

DE 10243748 A1 4/2003

OTHER PUBLICATIONS

German Examination Report dated Oct. 20, 2008.

* cited by examiner

*Primary Examiner* — Jewel Thompson
(74) *Attorney, Agent, or Firm* — Buchanan Ingersoll & Rooney PC

(57) ABSTRACT

The disclosure relates to a method for operation of a flow measurement device, and to a flow measurement device itself. In order in this case to record the conductivity of the medium or faults resulting from deposits by means of a measurement tube configuration in a technically simple manner, a total of at least 4 electrodes are arranged distributed on the circumference of the measurement tube, in the measurement tube. When a signal is fed in at one of the electrodes or at an electrode pair, an electric current is measured between one electrode pair, while an electrical voltage is measured between another electrode pair. An impedance value is determined from the two measured values, from which impedance value a conductivity of the medium is determined and/or in comparison of different conductivities or in comparison with historical values, it is deduced that there is a covering layer on the electrodes.

11 Claims, 4 Drawing Sheets

METHOD FOR OPERATION OF A FLOW MEASUREMENT DEVICE, AND A FLOW MEASUREMENT DEVICE ITSELF

RELATED APPLICATION

This application claims priority under 35 U.S.C. §119 to German Patent Application No. DE 10 2008 005 258.2 filed in Germany on Jan. 18, 2008, the entire content of which is hereby incorporated by reference in its entirety.

TECHNICAL FIELD

A method is disclosed for operation of a flow measurement device, and a flow measurement device is disclosed.

BACKGROUND INFORMATION

It is known that the use and accuracy of flow measurement devices, in particular of an inductive type, are limited by low conductivity of the measurement medium and deposits which occur on the electrodes during operation. This results in contact resistances in the galvanic coupling to the measurement medium, which corrupts the measurement results.

DE 102 43 748 A1 discloses an alternating-current signal being fed in onto one of the electrodes of the flow measurement device, and being measured with respect to a ground electrode.

This has the disadvantage that the voltage measurement is interfered with or corrupted by the current-carrying electrodes.

SUMMARY

The disclosure is in this case based on the object of overcoming this disadvantage, while nevertheless using a measurement tube configuration of a conventional type to record the conductivity of the medium and faults caused by deposits, in a technically simple manner.

A method for operation of a flow measurement device, such as an inductive flow measurement device, is disclosed. A medium flows through a measurement tube, as well as an arrangement of electrodes which are galvanically connected to the medium, wherein a total of at least 4 electrodes are arranged distributed on the circumference of the measurement tube, in the measurement tube, and wherein, when a signal is fed in at one of the electrodes or at an electrode pair, an electric current is measured between one electrode pair, while an electrical voltage is measured between another electrode pair, and wherein an impedance value is determined from the two measured values, from which impedance value a conductivity of the medium is determined and/or in comparison with historical values or in comparison of the values of the electrodes with one another, it is deduced that there is a covering layer on at least one of the electrodes.

In another aspect, an inductive flow measurement device is disclosed. Such an inductive flow measurement device comprises a measurement tube in which a medium flows through the measurement tube; an arrangement of electrodes which are galvanically connected to the medium in order to carry out an inductive flow measurement; and a permutating switch provided in relation to a drive for the electrodes. An automatic permutation of a signal feed is carried out in each case using another electrode.

BRIEF DESCRIPTION OF THE DRAWINGS

The disclosure will be described in more detail in the following text and is illustrated in the drawing, in which.

DETAILED DESCRIPTION

In one exemplary embodiment, a total of at least 4 electrodes are arranged distributed on the circumference of the measurement tube, in the measurement tube, and that, when a signal is fed in at one of the electrodes or an electrode pair, an electric current is measured between one electrode pair while an electrical voltage is measured between another electrode pair, and such that an impedance value is determined from the two measured values, from which impedance value a conductivity of the medium is determined, and/or in comparison with historical values or in comparison of the values of the electrodes with one another, it is deduced that there is a covering layer on at least one of the electrodes.

In another exemplary embodiment of the disclosure a series of signals is fed, possibly at offset times, in each case to another electrode, or to another pair of electrodes and the current between one electrode pair and the voltage across another electrode pair are measured and the measurements are permutated until a series of electrode pair combinations have been passed through and the impedance values have been determined, and conductivities are determined from the multiplicity of impedance values and/or in comparison with one another or with historical values, it is deduced that there is a covering layer on the electrodes.

If the conductivity were to be measured via the respective electrode at which the signal is also fed in, this would result in measurement errors, in particular as a result of the electrode-electrolyte impedance having a value which is not known precisely. This is precluded here.

Figure 1:
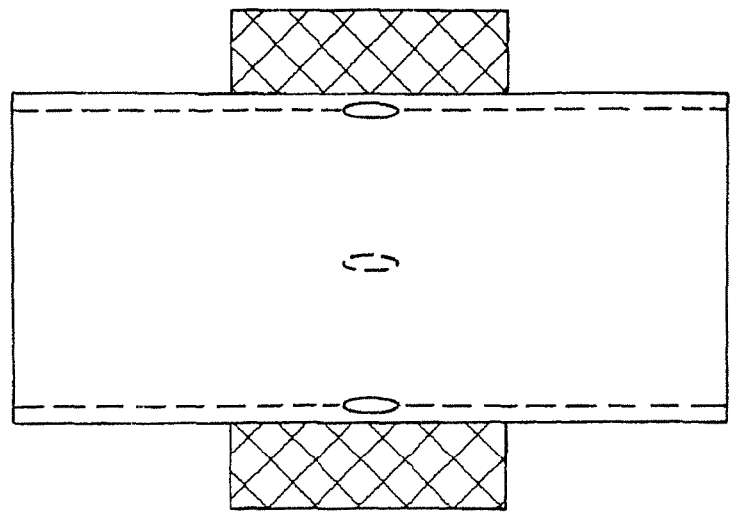
FIG. 1: shows an exemplary geometric arrangement of the electrodes in an inductive flowmeter. In this case, the upper drawing shows a side view, and the lower drawing a front view.
Figure 1:
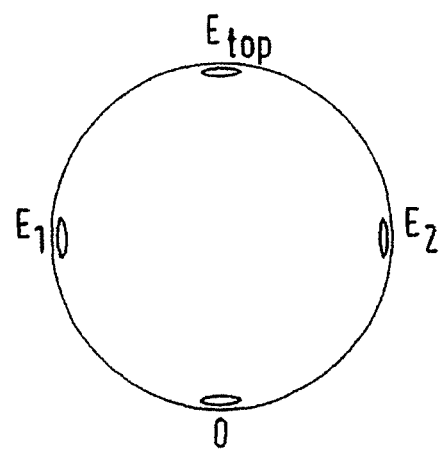

In yet another exemplary embodiment of the disclosure, in conjunction with the measurement method used, 4 electrodes (Ei, Ej, Ek, El) are arranged distributed in the measurement tube, on the circumference thereof, when seen in the form of a cross-sectional view of the measurement tube, in such a manner that, when the measurement tube is in the finally installed state, two electrodes are in each case arranged opposite, to be precise such that the connecting line is on the one hand located vertically and on the other hand horizontally with respect to the earth's attraction, see FIG. 1. This constellation relates to a ready-to-install state, that is to say to the installed state, of the measurement device. An alignment such as this is relevant when the upper electrode that results from this, the top electrode and the lower electrode, the bottom electrode, have a further function, such as determination of the measurement tube completely filled with measurement medium, or the bottom electrode is used for (additional) grounding of the measurement device, while the two horizontal electrodes are used for the actual flow measurement.

In one exemplary embodiment, this method is used for an arrangement of the electrodes (Ei, Ej, Ek, El) with an essentially symmetrical distribution in the measurement tube, and a measurement is used in which the current is fed in between two electrodes, which are adjacent with respect to the cross-sectional circumferential line of the measurement tube, and the voltage is measured between the two other adjacent electrodes. To this end, in general, a technical device must be provided which switches the voltage measurement between the electrodes, as is used for the normal flow measurement, to a corresponding current feed and voltage measurement between adjacent electrodes.

In the case of the 4-electrode arrangement in one exemplary embodiment, this also means that, for example, the measurement electrodes are arranged on the left and right and the top electrode is used for "empty pipe" determination, and the bottom electrode as a ground electrode. The top electrode and a measurement electrode can be combined as an electrode pair for measurement in the above sense.

Figure 2:
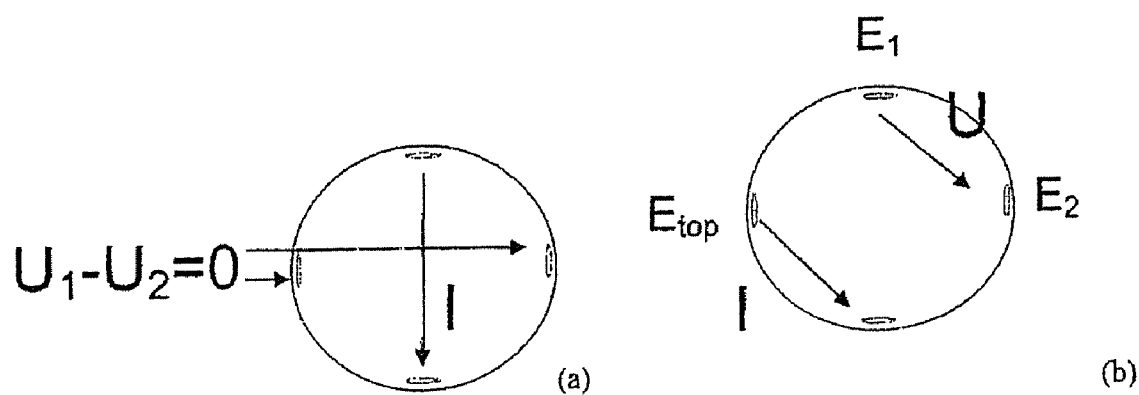
FIG. 2: relates to an exemplary measurement configuration. Two possible measurement configurations for current and voltage on the four electrodes are shown.

This means that, in order to measure the conductivity and/or the impedance value, the same is in each case measured between two electrodes whose imaginary connecting line lying on the cross section of the measurement tube is at about 45° to the vertical, see FIG. 2.

Another feature is that the various electrodes can be switched with respect to one another, for measurement in pairs, by means of one or more changeover switches, for said measurement.

Figure 4:
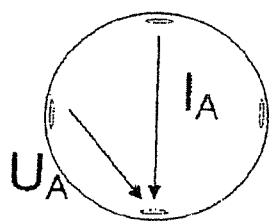
FIG. 4: relates to another exemplary measurement configuration, in which an impedance value is determined from the combination of two measurements.
Figure 4:
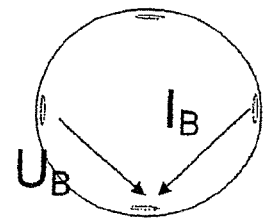

Furthermore, an electrical voltage $U_{ij}$ is measured between two electrodes Ei and Ej, and a first current $I_{ij}$ between two electrodes Ei and Ej and a second current $I_{kj}$ between the electrodes $E_k$ and $E_j$ are measured successively, and the impedance values $Za=U_{ij}/I_{ij}$ and $Zb=U_{ij}/I_{kj}$ are determined therefrom, see FIG. 4. An impedance value Z=Za−Zb is formed by forming the difference (or by some other mathematical conversion). This will in general be purely resistive and proportional to $1/\sigma$, where $\sigma$ is the conductivity of the medium. This value can therefore be used for conductivity measurement or can be compared by a comparison with a value from the calibration history, with the coverage state of the electrodes being determined therefrom.

With regard to a flow measurement device for carrying out the method according to the disclosure, the essence of the disclosure consists in that a permutating changeover switch is provided between a drive for the electrodes, by means of which an automatic permutation of the signal feed can be carried out in each case by means of another electrode, and likewise permutating current and voltage measurements can be controlled between respectively different electrode pairs.

In yet another exemplary embodiment, an evaluation device is provided, in which the current/voltage values obtained by permutation can be determined as impedance values, and in which the conductivity can be determined from the multiplicity of impedance values and, in comparison of the values determined in this way with one another or with historical values from a storage device, the covering layer that has been created on the electrodes can be deduced.

The upper part of the illustration in FIG. 1 shows, schematically, the measurement tube of the inductive flow meter, and the externally arranged magnet system as well as the electrodes. A measurement medium whose flow is determined in this case flows through the measurement tube.

The lower part of the illustration in FIG. 1 shows, schematically, an outline cross section through the measurement tube, and shows the position of the 4 electrodes that have been placed in this exemplary embodiment. The top electrode E-top is at the top, and the ground electrode (bottom electrode) 0 is at the bottom. The imaginary connecting line is in this example approximately parallel to the g-vector of the acceleration due to gravity. The two measurement electrodes E1 and E2 are located such that their connecting line is approximately at right angles to the connecting line between E-top and 0. The upper measurement electrode is in general used to determine the filling level of the tube, while the bottom electrode is in general a ground electrode. In this case, this bottom electrode may also alternatively be formed by a tube ground.

In addition, in this case, the wording "adjacent electrode" is defined as meaning the "electrode located adjacent along the circumferential line around the measurement tube". That is to say, in this example, E2 is directly adjacent to E-top and the 0-electrode, etc.

This illustrated 4-electrode arrangement is the arrangement on which the exemplary embodiment which will also be described in the following text is based.

FIG. 2 shows two possible exemplary measurement configurations. In example a), the measured voltage U1-U2 will be equal to zero because the symmetry, as a result of which it is not possible to determine any impedance value other than zero. In the configuration b), the voltage is measured between the electrodes E1 and E2 defined there, and the current is measured between E-top and 0 (ground electrode). The change, permutation of the measurement application to the electrodes in the manner shown in b), results in an undisturbed impedance value, which is in particular not zero. That is to say, permutation does not mean or does not just mean the different electrode combination of an electrode functional distribution as defined in FIG. 1, but that the electrode function is assigned to the respective electrodes. That is to say, FIG. 1 shows only the defined position of the electrode positions with respect to one another, while the disclosure can now also permutate the functions of the individual electrodes. This is evident from the comparison of FIG. 1 with FIG. 2. The top electrode E-top (shown in) FIG. 1 becomes the measurement electrode E1 in FIG. 2b), etc.

This type of permutation is an essential component of the method aspect of the disclosure, and should accordingly be understood in this manner.

The current measured according to FIG. 2b) between E-top and 0, as well as the voltage measured between the measurement electrodes E1 and E2, is in consequence not zero. The impedance value determined from Z=U/I is proportional to $1/\sigma$, where $\sigma$ is the conductivity of the medium. The conductivity can then be determined by determining the proportionality factor. If the liquid, as the medium being passed through the measurement tube, is essentially resistive, then the impedance value essentially comprises only the real part. There is then no need to determine the phase relationship between the voltage and the current.

An alternative exemplary method is for the conductivity to be determined from two results of impedance measurements. This is based on the assumption that only one ground electrode 0 is provided, or that the current preferably flows via the ground electrode. This allows an impedance matrix to be defined:

$$\begin{pmatrix} U1 \\ U2 \\ U3 \end{pmatrix} = \begin{pmatrix} Z11 & Z12 & Z13 \\ Z21 & Z22 & Z23 \\ Z31 & Z32 & Z33 \end{pmatrix} \begin{pmatrix} I1 \\ I2 \\ I3 \end{pmatrix}$$

Assuming that the bottom electrode is also the ground electrode 0, then this is evident from the matrix form, where U3=U-top.

Figure 3:
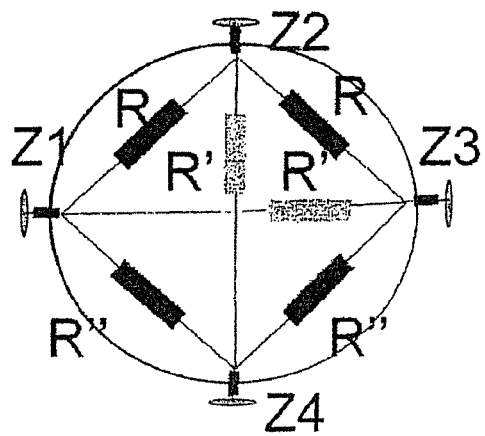
FIG. 3: shows an exemplary equivalent circuit of the impedances between the four electrodes, including the electrode/electrolyte impedances.

The impedance values have the equivalent circuit as shown in FIG. 3, because of the matrix form. The illustration comprises electrode impedances Zi at each electrode. As a result of the symmetry in FIG. 3, the inner resistance values are therefore also related, that is to say they are proportional to $1/\sigma$.

In these circumstances, the impedance values are obtained only by combination. This is done by means of the plurality of measurements described. For example, a current Ia is fed in on the top electrode and a first voltage Ua is measured between a measurement electrode and the ground electrode, thus resulting in Za=Ua/Ia.

The current and the voltage are permutated again in a second measurement, that is to say the voltage Ub is measured between one measurement electrode and the ground electrode, and the current Ib is measured between the other measurement electrode and the ground electrode.

This results in Zb=Ub/Ib.

The difference Z=Za−Zb is then formed. This impedance value has the advantage that the influence of the electrode impedance stands out, as a result of which the value is resistive and is proportional to $1/\sigma$.

Covering layers which are created on the electrodes can be determined in this way only by comparison with nominal values relating to the resistance or the conductivity. Alternatively, the method can be repeated by permutation of the electrode pairs, and the impedance and conductivity measurement obtained in this way can be compared in the meantime, with a coating being deduced as a result of any discrepancy.

Figure 5:
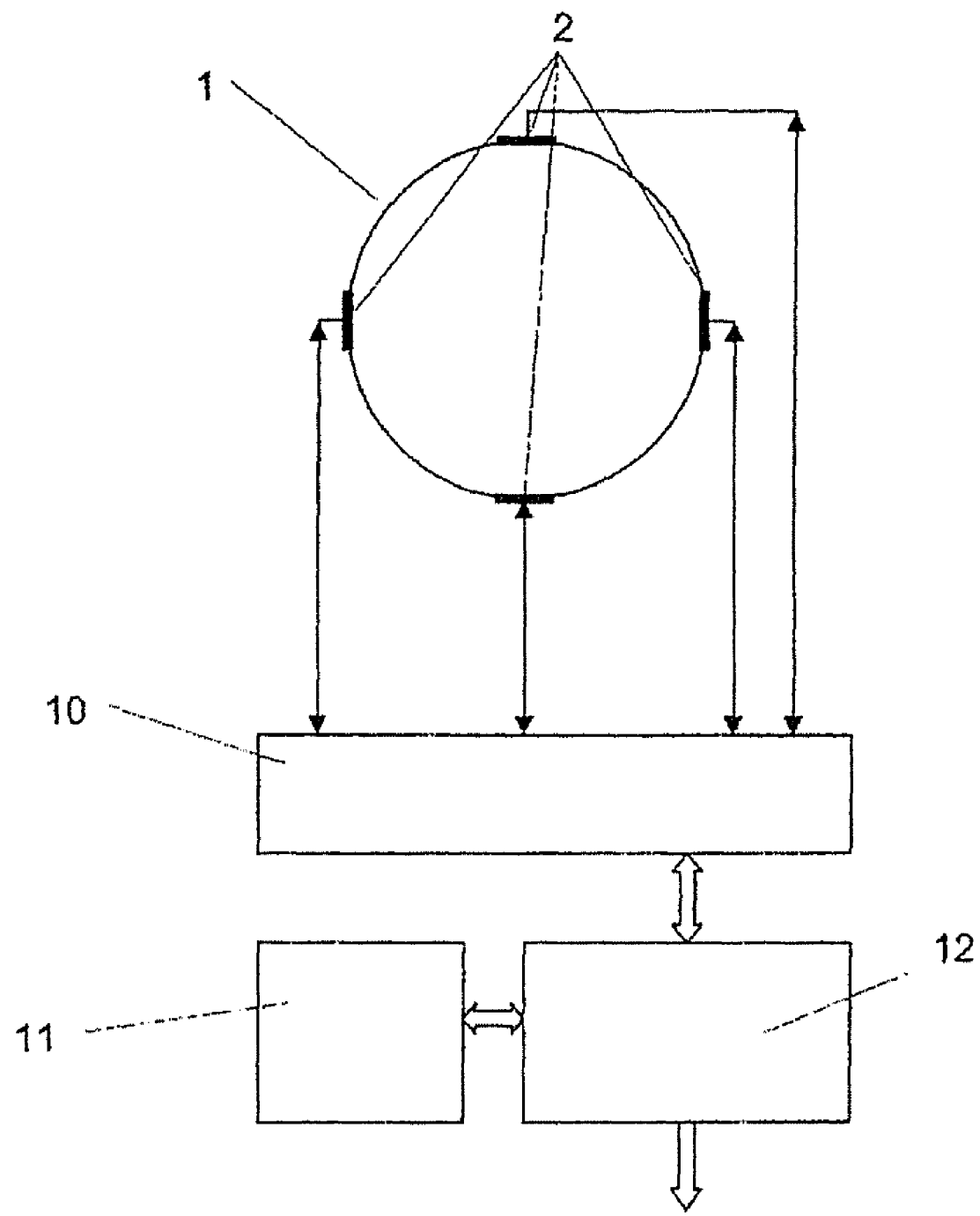
FIG. 5: shows a schematic overview of the operation of the flow measurement device according to the disclosure.

FIG. 5 shows a schematic overview of the operation of the flow measurement device according to the disclosure. In this example, the said four electrodes 2 are placed appropriately within the measurement tube 1. The electrodes are driven in the manner described above according to the method via a drive device, with the drive device 10 integrally also containing the changeover switch, described according to the disclosure, for permutation of the electrode pair combinations. The current and voltage values detected from the electrodes are then provided with indexes relating to the previously respectively selected electrode pair combinations, and are stored in an appropriate data field, addressed via these indexes, for example Zij=Ui/Ij. This is to ensure that only not only the respective current/voltage values but also the impedance values and/or conductivity values which can be derived from them can then be associated with the respective electrode pair combination on which they are based. This addressable data field 11 in this case also corresponds with historical data which has already also been written internally, so that changes over the course of time can be identified automatically. The covering layer which may have been created on the electrodes over the operating time is then calculated directly, as described above, in an evaluation device 12 from the determined values that have been mentioned.

The output value from the evaluation device 12 can then either be displayed or can be automatically recorded in a measurement record.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for operation of a flow measurement device, in which a medium flows through a measurement tube, including at least four electrodes arranged on an interior circumference of the measurement tube, the at least four electrodes being galvanically connected to the medium, the method comprising:
    feeding a signal in at one of the electrodes or at an electrode pair;
    measuring an electric current between one electrode pair, and measuring an electrical voltage between another electrode pair;
    determining an impedance value from the two measured values; and
    determining if there is a covering layer on at least one of electrodes by at least one of determining a conductivity of the medium from the impedance value, comparing the impedance value with historical impedance values and comparing impedance values of the electrodes.

2. The method as claimed in claim 1, comprising:
    feeding a series of signals at another electrode or another electrode pair;
    measuring a current between one electrode pair and a voltage across another electrode pair;
    permutating the measurements until a series of electrode pair combinations have been passed through and the impedance values have been determined; and
    determining if there is a covering layer on at least one of the electrodes by at least one of determining a conductivity of the medium for each of the multiplicity of impedance values and comparing the multiplicity of impedance values with one another.

3. The method as claimed in claim 1,
    wherein the arrangement of electrodes includes four electrodes distributed uniformly on the inner circumference of the measurement tube, wherein adjacent electrodes have an angle between them of approximately 90 degrees, and the electrode pairs are chosen such that respectively adjacent electrodes are used for the current measurement and for the voltage measurement.

4. The method as claimed in claim 3,
    wherein the electrodes can be connected to one another for a measurement in pairs, by means of one or more switches for said measurement.

5. The method as claimed in claim 1, comprising:
    measuring an electrical voltage $U_{ij}$ between two electrodes Ei and Ej;
    applying successively a first current $I_{ij}$ between the two electrodes Ei and Ej and a second current $I_{kj}$ between two electrodes $E_k$ and $E_j$;
    determining impedance values Za=$U_{ij}/I_{ij}$ and Zb=$U_{ij}/I_{kj}$ therefrom;
    forming an impedance value Z=Za−Zb by the difference (or by any suitable mathematical function), and determining the covering state of at least one of the electrodes from at least one of using the impedance value Z to determine a conductivity of the medium, comparing the impedance value Z with a value obtained from a calibration history, and comparing the impedance values Za and Zb with one another.

6. The method as claimed in claim 2,
    wherein the arrangement of electrodes includes four electrodes distributed uniformly on the interior circumference of the measurement tube, wherein adjacent electrodes have an angle between them of approximately 90 degrees, and the electrode pairs are chosen such that respectively adjacent electrodes are used for the current measurement and for the voltage measurement.

7. The method as claimed in claim 4, comprising:
measuring an electrical voltage $U_{ij}$ between two electrodes Ei and Ej;
applying successively a first current $I_{ij}$ between two electrodes Ei and Ej and a second current $I_{kj}$ between $E_k$ and $E_j$;
determining impedance values $Za=U_{ij}/I_{ij}$ and $Zb=U_{ij}/I_{kj}$ therefrom;
forming an impedance value $Z=Za-Zb$ by the difference (or by any suitable mathematical function), and
determining the covering state of at least one of the electrodes from at least one of the using the impedance value Z to determine the conductivity of the medium, comparing the impedance value Z with a value obtained from a calibration history, and comparing the impedance values Za and Zb with one another.

8. The method as claimed in claim 1, wherein the flow measurement device is an inductive flow measurement device.

9. The method as claimed in claim 2, wherein the series of signals are fed at offset times.

10. A flow measurement device comprising:
a measurement tube through which a medium can flow;
an arrangement of electrodes for galvanically connecting to the medium;
a permutating switch provided between a drive for the electrodes, for carrying out an automatic permutation of the signal feed in each permutation by another electrode, and for controlling permutating current and voltage measurements between respectively different electrode pairs; and
an evaluation device for using the current/voltage values obtained by permutation to determine impedance values, for determining if there is a covering layer on the electrodes by at least one of determining a conductivity of the medium from the multiplicity of impedance values, comparing the impedance values with one another and comparing the impedance values with a stored historical value.

11. The flow measurement device as claimed in claim 10, comprising:
four electrodes distributed uniformly on an interior circumference of the measurement tube, wherein adjacent electrodes have an angle between them of approximately 90 degrees and the electrode pairs are chosen such that respectively adjacent electrodes are used for the current measurement and for the voltage measurement.

* * * * *